United States Patent
Povroznik, III et al.

(10) Patent No.: US 12,179,931 B2
(45) Date of Patent: Dec. 31, 2024

(54) EXTERNAL POWER SAFETY ALERT FOR A VEHICLE

(71) Applicant: Lockheed Martin Corporation, Bethesda, MD (US)

(72) Inventors: Stephen B. Povroznik, III, Milford, CT (US); Timothy R. Budd, Stratford, CT (US); James R. Malo, Asbury, WV (US)

(73) Assignee: Lockheed Martin Corporation, Bethesda, MD (US)

( * ) Notice: Subject to any disclaimer, the term of this patent is extended or adjusted under 35 U.S.C. 154(b) by 312 days.

(21) Appl. No.: 17/689,596

(22) Filed: Mar. 8, 2022

(65) Prior Publication Data

US 2023/0286667 A1   Sep. 14, 2023

(51) Int. Cl.
*B64D 31/14*  (2006.01)
*B64D 31/06*  (2024.01)
*B64D 41/00*  (2006.01)

(52) U.S. Cl.
CPC ............. *B64D 31/14* (2013.01); *B64D 31/06* (2013.01); *B64D 41/00* (2013.01)

(58) Field of Classification Search
CPC ........ B64D 31/14; B64D 31/06; B64D 41/00; B64D 45/00; B64D 27/24; B64F 1/362
See application file for complete search history.

(56) References Cited

U.S. PATENT DOCUMENTS

| | | | | |
|---|---|---|---|---|
| 4,245,150 A | * | 1/1981 | Driscoll | H02H 3/24 377/52 |
| 8,344,541 B1 | * | 1/2013 | Li | B60R 16/0232 307/127 |
| 8,784,130 B2 | | 7/2014 | Scott et al. | |
| 2007/0040696 A1 | * | 2/2007 | Mubaslat | H05B 45/58 340/657 |
| 2010/0045193 A1 | * | 2/2010 | Konishi | H05B 45/60 315/210 |
| 2010/0264891 A1 | * | 10/2010 | Lee | H02M 3/158 323/282 |
| 2011/0140513 A1 | * | 6/2011 | Brookfield | H02J 7/345 307/9.1 |
| 2012/0139347 A1 | * | 6/2012 | Hackenberg | H02M 7/42 307/71 |

(Continued)

FOREIGN PATENT DOCUMENTS

| | | |
|---|---|---|
| CN | 105978092 A | 9/2018 |
| JP | 2009266777 A * | 11/2009 |
| WO | 2020098709 | 5/2020 |

*Primary Examiner* — Dale W Hilgendorf
*Assistant Examiner* — Frank T Glenn, III
(74) *Attorney, Agent, or Firm* — Michael Best & Friedrich LLP (57) ABSTRACT

Systems and methods for alerting reverse current conditions of vehicle charging systems. One embodiment provides an aircraft power system comprising an aircraft power source and a notification device. The notification device includes a control unit configured to monitor a supply of current from an external power supply to the aircraft power source and detect a reverse current condition of current flowing from the aircraft power source to the external power supply. In response to detecting the reverse current condition, the control unit is configured to provide a notification indicative of the reverse current condition.

19 Claims, 6 Drawing Sheets

(56) References Cited

U.S. PATENT DOCUMENTS

| | | | |
|---|---|---|---|
| 2014/0168835 A1* | 6/2014 | Fornage | H01L 31/02008 |
| | | | 361/57 |
| 2016/0043505 A1* | 2/2016 | Wu | H01R 13/11 |
| | | | 439/217 |
| 2017/0087997 A1* | 3/2017 | Trunk | H02M 1/32 |
| 2019/0070995 A1* | 3/2019 | Cantrell | B64U 70/50 |
| 2021/0111574 A1 | 4/2021 | Wu | |
| 2021/0237610 A1* | 8/2021 | Zheng | H02J 7/00302 |

\* cited by examiner

EXTERNAL POWER SAFETY ALERT FOR A VEHICLE

FIELD OF INVENTION

Embodiments described herein relate to safety alerts for a vehicle, and, in particular, alerts for reverse current conditions of a vehicle charging system, such as, for example, an aircraft charging system.

SUMMARY

Figure 1:
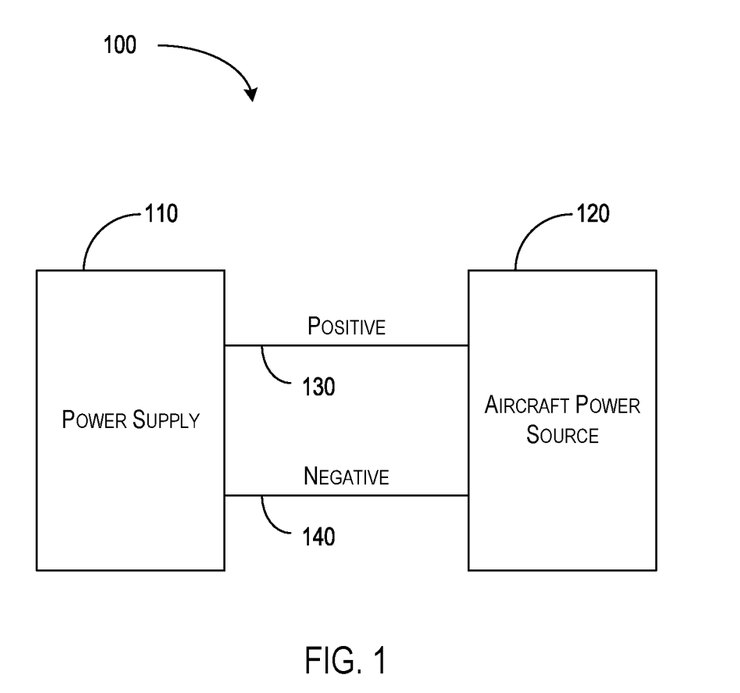
FIG. 1 depicts a charging system for an aircraft, according to one example.

Aircraft battery sources are commonly charged by an external power source. For example, FIG. 1 illustrates a charging system 100 for an aircraft. A power supply 110 (for example, a direct current (DC) power supply or an alternating current (AC) power supply) is coupled to an aircraft power source 120 (for example, a battery) via a positive line 130 (for example, a power line) and a negative line 140 (for example, a ground line, a neutral line, or a return line). To charge the aircraft power source 120, current flows from the power supply 110 to the aircraft power source 120.

In some instances, the power supply 110 is shut off due to a charge level of the power supply 110 being exhausted or due to a fault. In this situation, current may flow in a reverse direction from the aircraft power source 120 to the power supply 110. Reverse current flow may result in overheating and damage of hardware. Although aircraft, the external power source, or both may include mechanisms for safely addressing such a reverse current situation, personnel may not know to activate such mechanisms as they are unaware that the condition is occurring. Accordingly, there is a need to provide alerts when an aircraft power source is discharging to an external power supply.

Embodiments described herein provide systems and methods for generating an alert (sometimes also referred to as a "notification" in the present application) when a detected reverse current condition is detected. A notification device is provided between an aircraft power source and an external power supply. The notification device monitors a control line coupled between the aircraft power source and the power supply. When the power supply is providing a charge current to the aircraft power source, the power supply also provides a voltage to the control line. When the power supply stops providing charge current, no voltage is provided on the control line by the power supply. Accordingly, the notification device is configured to detect a voltage of the control line. When the notification device detects a voltage below a predetermined threshold on the control line but detects an active current on the power line, a reverse current condition is occurring, and the notification device generates an audio alert, a visual alert, or a combination thereof to alert personnel of the reverse current condition.

One embodiment provides an aircraft power system comprising an aircraft power source and a notification device. The notification device is coupled between the aircraft power source and an external power supply. The notification device is located external to an aircraft. The notification device includes a control unit configured to monitor a supply of current from the external power supply to the aircraft power source and detect a reverse current condition of current flowing from the aircraft power source to the external power supply. In response to detecting the reverse current condition, the control unit is configured to provide a notification indicative of the reverse current condition.

Another embodiment provides a notification device connected to a power line, a ground line, and a control line coupled between an aircraft power source and a power supply located external to the aircraft power source. The notification device includes a controller. The controller is configured to monitor a voltage value of the control line and detect a reverse current condition based on the voltage value of the control line. In response to detecting the reverse current condition, the controller is configured to activate an indicator to indicate the reverse current condition.

Another embodiment provides a method for detecting a reverse current condition of an aircraft power system. The aircraft power system includes a power supply, an aircraft power source, and a notification device. The notification device is connected between the power supply and the aircraft power source via at least a control line. The method includes monitoring, with a controller included in the notification device, a voltage value of the control line, and detecting, with the controller, a reverse current condition based on the voltage value of the control line. In response to detecting the reverse current condition, the method includes activating, with the controller, at least one visual indicator and an audible indicator included in the notification device to indicate the reverse current condition.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and data exchanges may be performed using any known means including direct connections, wireless connections, and the like.

It should be noted that a plurality of hardware and software-based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software-based devices, as well as a plurality of different structural components may be used to implement the embodiments described herein. For example, "controller," "control unit," and "control assembly" described in the specification may include one or more processors, one or more memory modules including non-transitory computer-readable medium, one or more input/output interfaces, and various connections (for example, a system bus) connecting the components.

As noted above, in some situations, a reverse current condition occurs when charging a power source of an aircraft from an external power source. Embodiments described herein provide a notification device for detecting such a reverse current condition of an aircraft power source. The notification device is connected between the external power supply and the aircraft power source. When the external power supply is connected to the aircraft and energized, the external power supply provides power to the aircraft power source. However, in some instances, when the external power supply is connected to the aircraft but is turned off, the aircraft power source back-feeds current into the external power source. As described in more detail below, the notification device is configured to detect such a reverse current condition and generate one or more alerts. In some examples, to detect the reverse current condition, the notification device monitors a control line connected to both the external power supply and the aircraft power source.

It should be understood that although embodiments are described herein with reference to aircraft charging systems, the systems and methods described herein can be used in other charging systems, such as, for example, vehicle charging systems, including electric and hybrid passenger vehicles and commercial vehicles.

Figure 2:
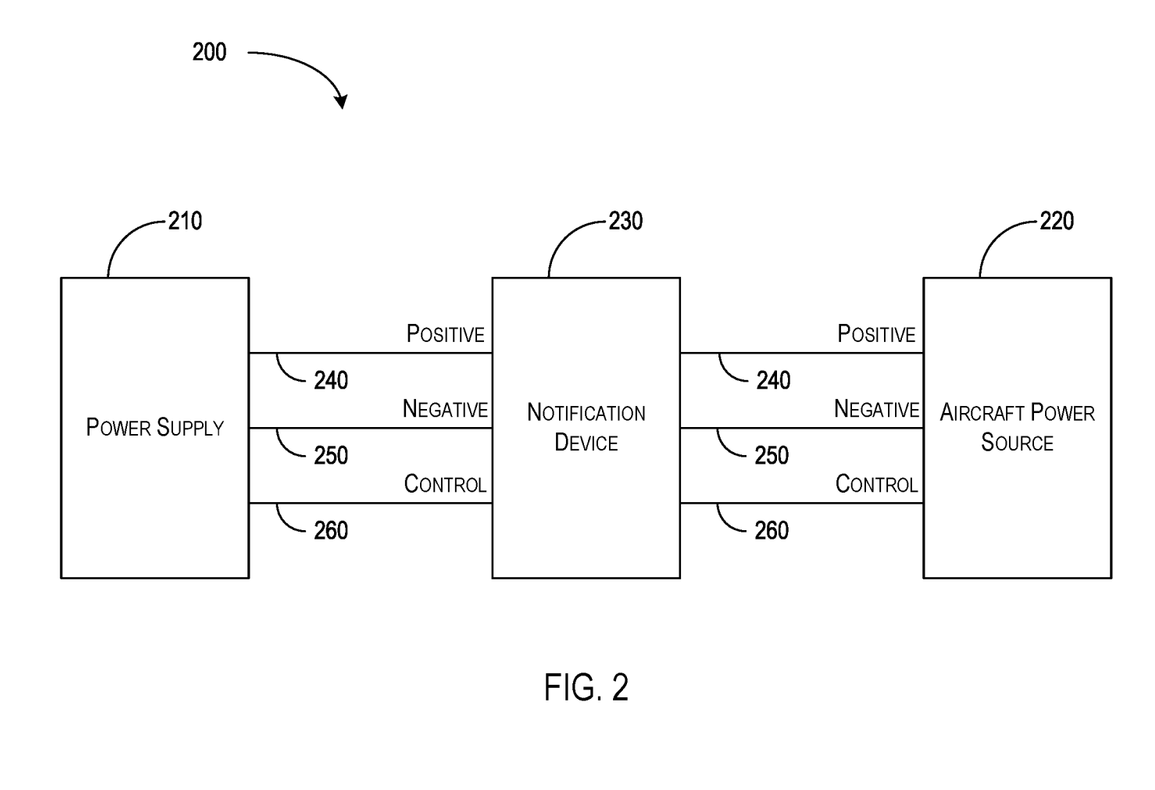
FIG. 2 depicts a charging system for an aircraft, according to another example.

Referring now to the figures, FIG. 2 depicts an example charging system 200. The system 200 includes an aircraft power source 220, which may include one or more batteries, capacitors, or other energy storage devices. In some examples, the aircraft power source 220 is located internal to an aircraft. The aircraft may be, for example, a rotary wing aircraft, a turboprop aircraft, a piston aircraft, a jet, a fixed wing aircraft, a transport aircraft, or some other aircraft or air vehicle. A power supply 210 is coupled to the aircraft power source 220 to charge the aircraft power source 220. In some examples, the power supply 210 is located external to the aircraft. The power supply 210 may be either a direct current (DC) power supply or an alternating current (AC) power supply. The power supply 210 is coupled to the aircraft power source 220 via a positive line 240 (for example, a power line), a negative line 250 (for example, a ground line, a neutral line, or a return line), and a control line 260.

The charging system 200 also includes a notification device 230. The notification device 230 is coupled between the power supply 210 and the aircraft power source 220. In particular, in some embodiments, the notification device 230 is connected to the power line 240, the negative line 250, and the control line 260. During normal operation (for example, a charging operation, a normal current condition), current flows along the power line 240 from the power supply 210 to the aircraft power source 220. The current may be, for example, greater than 1000 amps. In some examples, when the power supply 210 is providing a charging current, the power supply 210 provides a voltage to the control line 260. Accordingly, in some embodiments, a positive voltage on the control line 260 indicates that the power supply 210 is active and providing a charging current to the aircraft power source 220 (for example, indicates normal operation).

When the power supply 210 is in an OFF state or is otherwise not providing a charging current to the aircraft power source 220, the power supply 210 does not provide a voltage to the control line 260. In such an instance, the control line 260 has a voltage value of zero or approximately zero (for example, a nominal voltage). For example, a minor voltage value may be present on the control line 260 due to electromagnetic forces even when the power supply 210 is not actively supplying a voltage to the line 260. In some embodiments, the power supply 210 can be placed in the OFF state manually. For example, the power supply 210 may include a manual mechanism for stopping a charging current. The power supply 210 may also be configured to automatically turn OFF in response to detecting a fault condition. In either situation, the power supply 210 stops the charging current and sets the control line 260 to zero.

The notification device 230 monitors the voltage values of the power line 240, the negative line 250, the control line 260, or a combination thereof to monitor operation of the power supply 210. For example, as described in more detail below with respect to one example method, when the control line 260 has a non-zero voltage value, the notification device 230 determines that normal operation (for example, a forward current or charging condition) of the power supply 210 is occurring. However, when the control line 260 has a voltage value of approximately zero, the notification device 230 may analyze the voltage value of the power line 240. When the control line 260 has a voltage value of zero and the power line 240 has a non-zero voltage value, the notification device 230 may determine that a reverse current condition is present. In response to detecting such a reverse current condition, the notification device 230 provides an alert.

Figure 3:
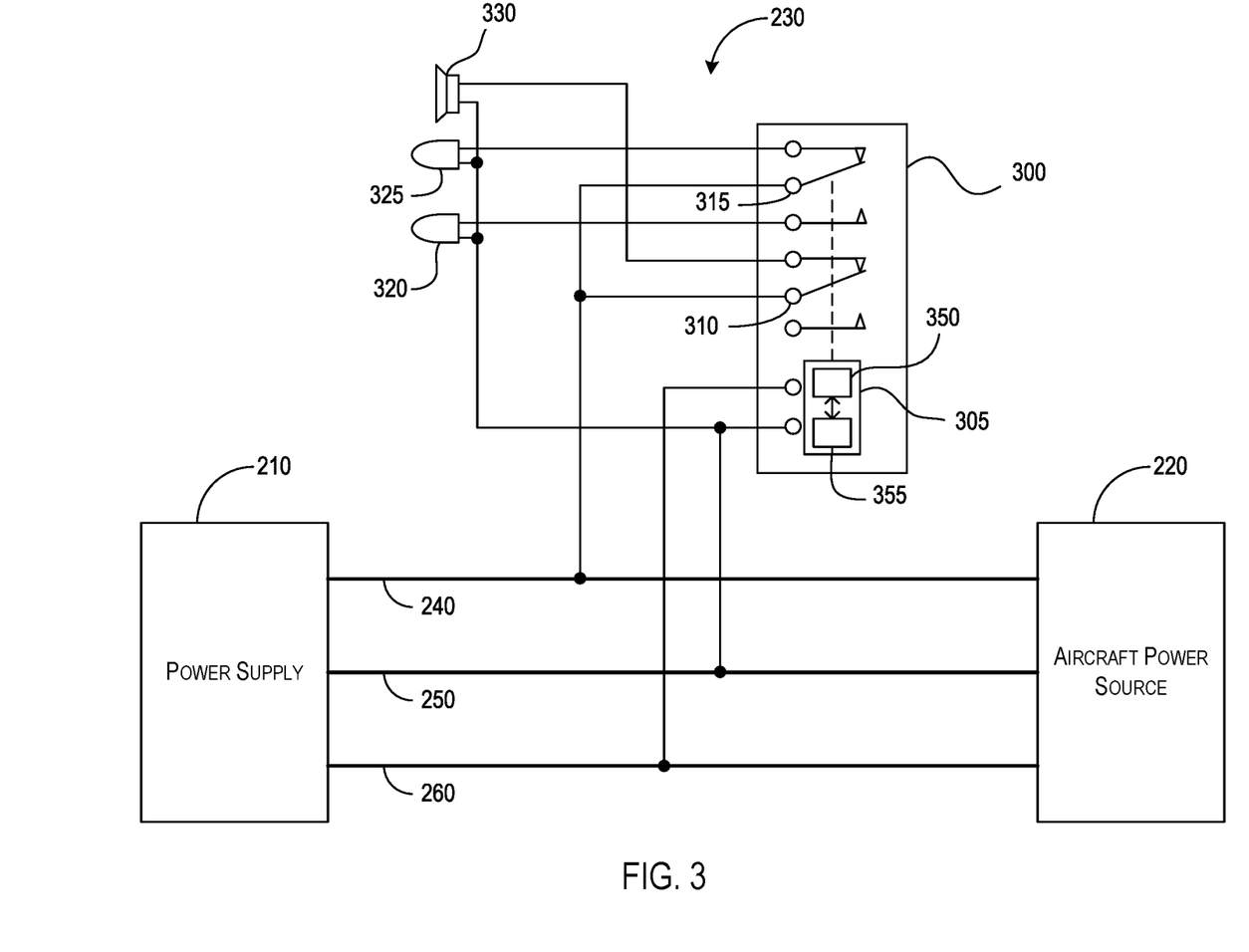
FIG. 3 depicts a circuit diagram for a notification device, according to one example.

FIG. 3 depicts one example of the notification device 230. The notification device 230 includes a control unit 300. The notification device 230 also includes one or more visual indicators), one or more audible indicators, or a combination thereof. For example, in the example illustrated in FIG. 3, the notification device 230 includes a first visual indicator 320, a second visual indicator 325, and an audible indicator 330. The visual indicators may include, for example, light emitting diodes (LEDs), lamps, screens, or devices capable of emitting light. The audible indicators may include, for example, a speaker, a buzzer, or other device capable of emitting sound. In the example of FIG. 3, the control unit 300 includes a controller 305, a first switch 310, and a second switch 315. In other examples, the control unit 300 includes more or fewer switches. Additionally, the control unit 300 may include fewer or additional components.

In some examples, the controller 305 includes an electronic processor 350 (for example, a microprocessor or another electronic device) and a memory 355. The memory 355 may include read only memory (ROM), random access memory (RAM), other non-transitory computer-readable media, or a combination thereof. The electronic processor 350 is configured to retrieve instructions from the memory 355 and execute, among other things, the retrieved instructions to control the operation of the notification device 230.

In certain instances, the electronic processor 350 executes instructions stored in the memory 355 to perform methods described herein.

The controller 305 controls the first switch 310 and the second switch 315 to control power to the first visual indicator 320, the second visual indicator 325, and the audible indicator 330. The first switch 310 is configured to control the audible indicator 330, and the second switch 315 is configured to control the first visual indicator 320 and the second visual indicator 325. As described below, the controller 305 is configured to detect a forward current condition of the power supply 210 (normal operation) and a reverse current condition. In response to detecting normal operation, the controller 305 controls the first switch 310 to an energized position (for example, a first position) such that the audible indicator 330 is deactivated (no longer connected to a power source) and controls the second switch 315 to an energized position such that the first visual indicator 320 is activated (for example, in an ON condition) and the second visual indicator 325 is deactivated (for example, in an OFF condition). In response to detecting a reverse current condition, the controller 305 controls the first switch 310 to a de-energized position (for example, a second position) such that the audible indicator 330 is activated (connected to a power source) and controls the second switch 315 to a de-energized position such that the first visual indicator 320 is deactivated, and the second visual indicator 325 is activated. In some embodiments, the first visual indicator 320 is a green light, and the second visual indicator 325 is a red light, although color combinations, lighting patterns, or flashing sequences may be used. The audible indicator 330 is configured to emit a sound when activated. It should be understood that the notification device 230 may include any number of visual indicators, audible indicators, or combinations thereof. For example, in some embodiments, the notification device 230 only includes the first visual indicator 320 and the second visual indicator 325 and does not include any audible indicators. Alternatively, in some embodiments, the notification device 230 only includes one visual indicator, such as one LED. Similarly, in some embodiments, the notification device 230 only includes the audible indicator 330 and does not include any visual indicators.

In some examples, the notification device 230 further includes a power source, such as, for example, one or more battery cells or an alternative power source, to power the components of the notification device 230. In other examples, the notification device 230 is powered by power on the power line 240, the negative line 250, or a combination thereof. For example, during normal operation, the notification device 230 may be powered by the power line 240, and, during a reverse current condition, the notification device 230 may be powered by the power line 240 or the negative line 250. In some examples, the first switch 310 and the second switch 315 are coupled between the power line 240 and their respective connected first visual indicator 320, second visual indicator 325, and audible indicator 330. Accordingly, control of the first switch 310 and the second switch 315 connect the first visual indicator 320, the second visual indicator 325, the audible indicator 330, or a combination thereof to the power line 240.

The example of FIG. 3 illustrates the control unit 300 having the controller 305, the first switch 310, and the second switch 315. In other examples, the control unit 300 may be comprised of a switching array having a plurality of switching components (for example, MOSFETs). In this configuration, the voltage levels of the power line 240, the negative line 250, and the control line 260 are inputs to the switching array, and the switching array is configured to control the first visual indicator 320, second visual indicator 325, and audible indicator 330 as described above with respect to the controller 305.

Figure 4:
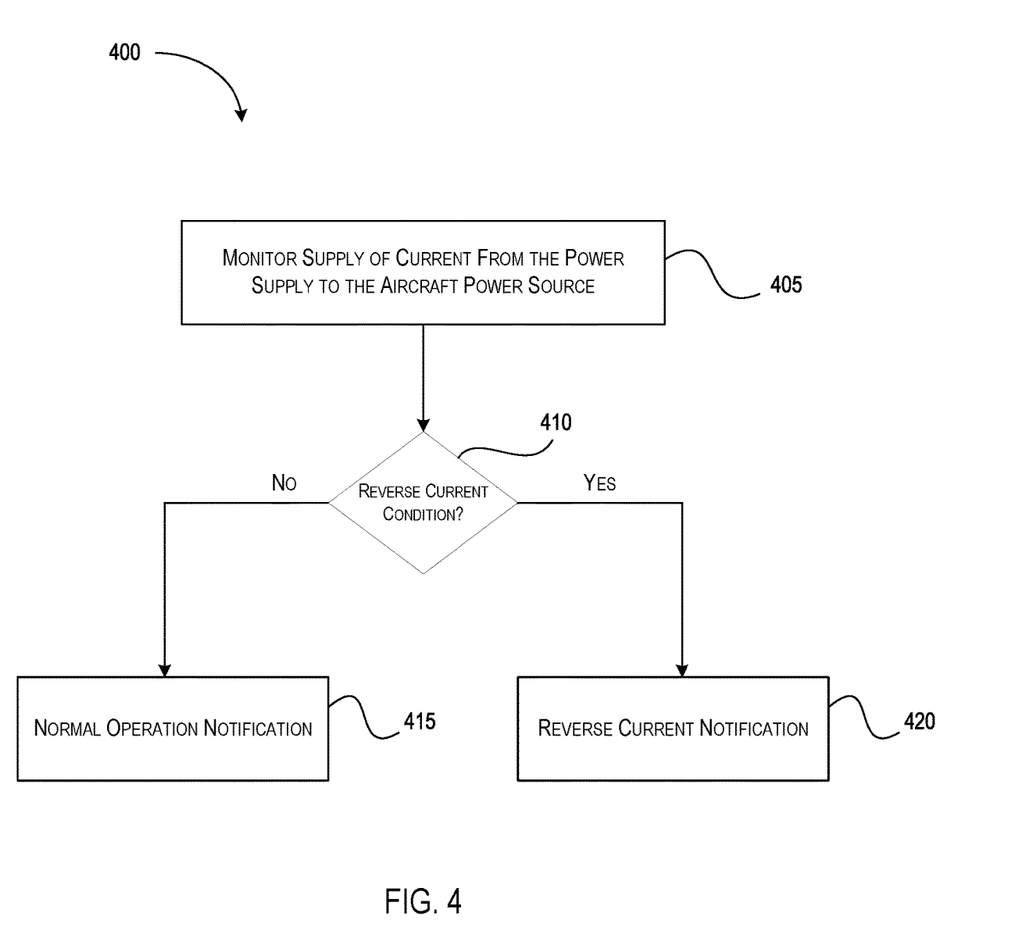
FIG. 4 depicts a method performed by the notification device of FIG. 3, according to one example.

FIG. 4 illustrates an example method 400 for monitoring the charging system 200. The method 400 is described as being executed by the controller 305. However, in some examples, aspects of the method 400 is performed by another device. For example, the functionality of the controller 305 may be distributed among multiple controllers included in the notification device 230, among multiple controllers external to but communicatively coupled to the notification device 230 (such as a controller included in or otherwise associated with the aircraft power source 220, a controller included in or otherwise associated with the power supply 210, or a combination thereof), or a combination thereof.

As illustrated in FIG. 4, the controller 305 monitors a supply of current from the power supply 210 to the aircraft power source 220 (at block 405). In some embodiments, the controller 305 monitors a value of the control line 260. In other embodiments, the controller 305 monitors the voltage value of the power line 240, the negative line 250, the control line 260, or a combination thereof.

Based on the monitored current supply, the controller 305 determines whether a normal operation condition or a reverse current condition is present (at block 410). Examples of this determination are provided below with respect to FIGS. 5 and 6. In response to detecting a normal operation condition, the controller 305 provides an alert indicative of normal operation of the charging system 200 (at block 415). For example, as described above, in response to detecting normal operation, the controller 305 controls the first switch 310 to an energized position and the second switch 315 to an energized position such that the first visual indicator 320 is activated.

Alternatively, in response to detecting a reverse current condition, the controller 305 provides an alert indicative of the reverse current condition (at block 420). For example, the controller 305 controls the second switch 315 to a de-energized position to deactivate the first visual indicator 320 and activate the second visual indicator 325. In some instances, the controller 305 also controls the first switch 310 to a de-energized position to activate the audible indicator 330.

Figure 5:
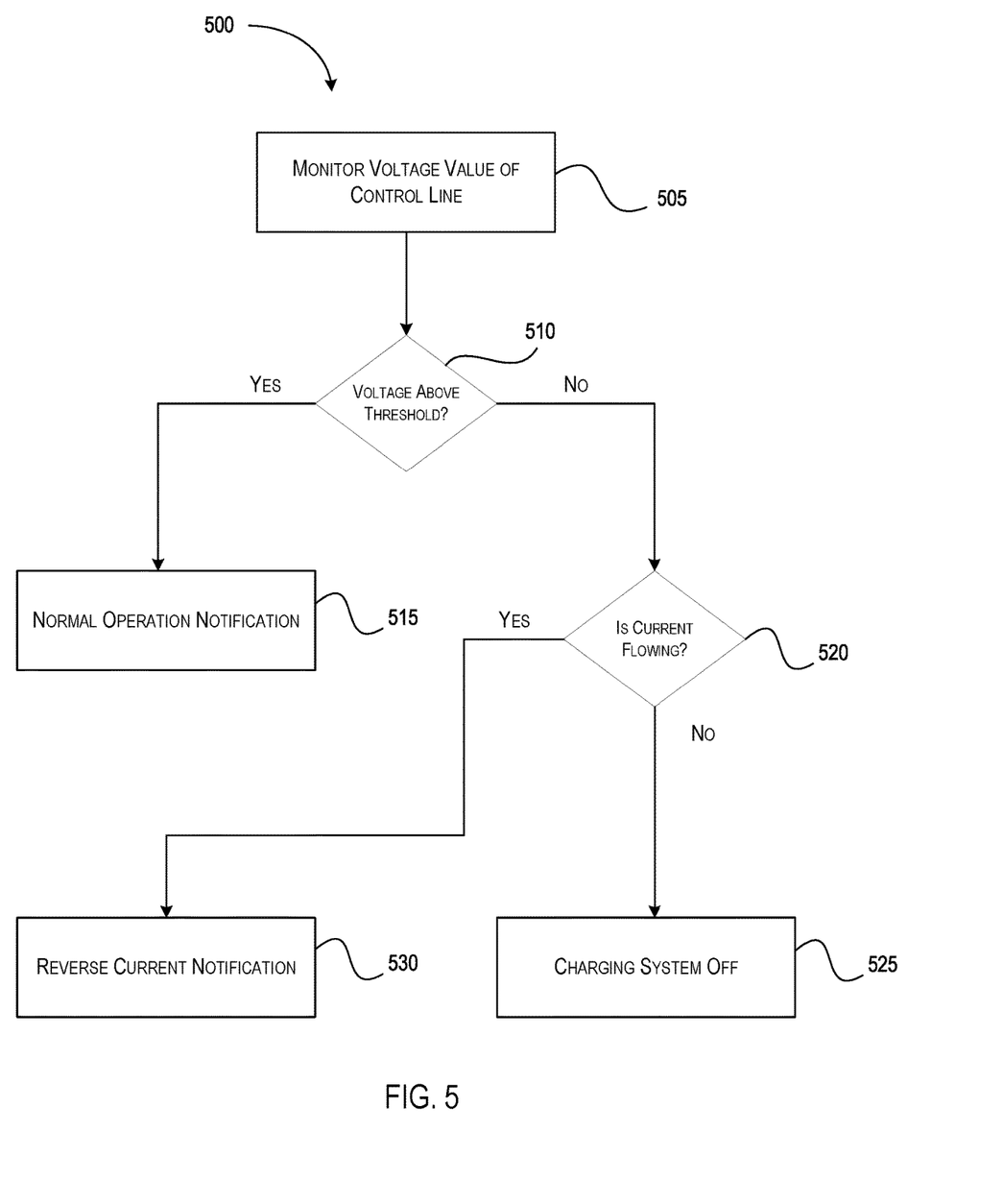
FIG. 5 depicts another method performed by the notification device of FIG. 3, according to one example.

FIG. 5 illustrates an example method 500 for determining a reverse current condition of the charging system 200. The method 500 is described as being executed by the controller 305. However, in some examples, aspects of the method 500 is performed by another device. For example, the functionality of the controller 305 may be distributed among multiple controllers included in the notification device 230, among multiple controllers external to but communicatively coupled to the notification device 230 (such as a controller included in or otherwise associated with the aircraft power source 220, a controller included in or otherwise associated with the power supply 210, or a combination thereof), or a combination thereof.

As illustrated in FIG. 5, to detect a reverse current condition, the controller 305 monitors a voltage value of the control line 260 (at block 505) and determines whether the voltage value of the control line 260 is above a voltage threshold (at block 510). The voltage threshold may be, for example, a non-zero value. In some examples, the voltage threshold is a nominal voltage, such as 0.5V. When the voltage value of the control line 260 is above the voltage threshold, the power supply 210 is providing a voltage to the control line 260, and the controller 305 determines normal operation (at block 515) of the charging system 200 is occurring. Alternatively, when the voltage value of the control line 260 is below the voltage threshold, the controller 305 proceeds to block 520.

In particular, when the voltage value of the control line 260 is below the voltage threshold, the controller 305 determines whether current is flowing between the aircraft power source 220 and the power supply 210 (at block 520). For example, the controller 305 may determine whether a voltage is present on the power line 240, and, when a voltage value of the power line 240 is approximately zero, a current is not flowing along the power line 240. When current is not flowing between the aircraft power source 220 and the power supply 210, the controller 305 proceeds to block 525 and determines the charging system 200 is inactive. Alternatively, when a voltage value of the power line 240 is non-zero, a current is flowing along the power line 240. When current is flowing between the aircraft power source 220 and the power supply 210 (and a zero or substantially zero voltage is detected on the control line 260 (at block 510)), the controller 305 determines a reverse current condition is present and proceeds to block 530. At block 530, the controller 305 provides a reverse current alert.

Figure 6:
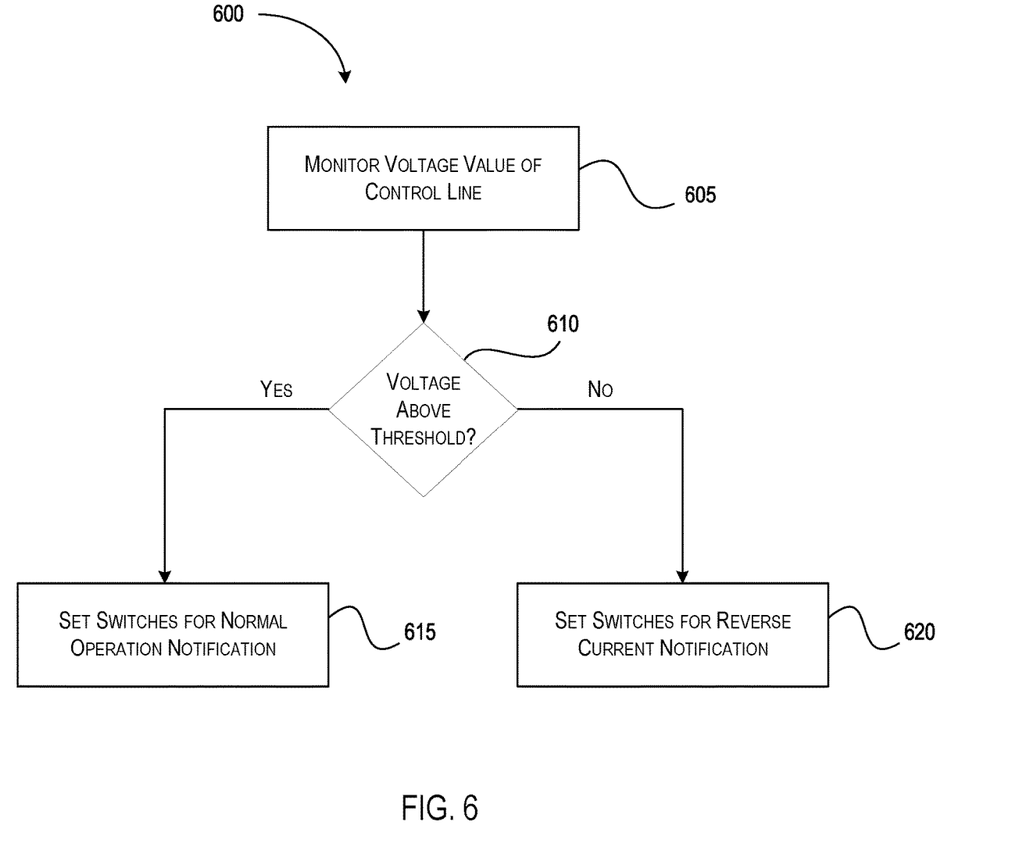
FIG. 6 depicts a further method performed by the notification device of FIG. 3, according to one example.

FIG. 6 illustrates another example method 600 for determining a reverse current condition of the charging system 200. As compared to the method 500, the method 600 uses the state of the control line 260 to set switch states, which passively activates one or more indicators depending on current flow (without having the controller 305 check the power line 240 as described above with respect to FIG. 5). The method 600 is described as being executed by the controller 305. However, in some examples, aspects of the method 600 is performed by another device. For example, the functionality of the controller 305 may be distributed among multiple controllers included in the notification device 230, among multiple controllers external to but communicatively coupled to the notification device 230 (such as a controller included in or otherwise associated with the aircraft power source 220, a controller included in or otherwise associated with the power supply 210, or a combination thereof), or a combination thereof.

As illustrated in FIG. 6, the controller 305 monitors a voltage value of the control line 260 (at block 605) and determines whether the voltage value of the control line 260 is above a voltage threshold (at block 610). When the voltage value of the control line 260 is above the voltage threshold, the power supply 210 is providing a voltage to the control line 260, and the controller 305 provides a notification indicative of normal operation (at block 615)

When the voltage value of the control line 260 is below the voltage threshold, the power supply 210 is not providing a voltage to the control line 260, and the controller 305 sets one or more switches (for example, the first switch 310, the second switch 315, or both), such that an alert will be generated if a reverse current condition occurs (at block 620). For example, when the voltage value of the control line 260 is below the voltage threshold, the controller 305 controls the second switch 315 to a de-energized position to deactivate the first visual indicator 320 and activate the second visual indicator 325. In some instances, the controller 305 also controls the first switch 310 to a de-energized position to activate the audible indicator 330. With the switches in these positions, the second visual indicator 325 and the audible indicator 330 will be activated if a reverse current condition occurs. In particular, when a reverse current condition occurs, the switches 310 and 315 are set such that the second visual indicator 325 and the audible indicator 330 will receive the reverse current and, thus, be activated. Accordingly, in this example, the controller 305 only checks the control line 260 and sets the switches based on the control line 260.

Accordingly, embodiments described herein provide methods, systems, and devices for detecting a reverse current condition occurring with respect to aircraft components being charged by external power sources and generating an alert in response to detecting the same. The figures and corresponding description provided herein represent example embodiments and other embodiments are possible. For example, in some embodiments, a negative voltage is provided on the control line 260 to indicate that the power supply 210 is providing current to the aircraft power source 220. Accordingly, in this situation, the controller 305 may be configured to check for negative voltage on the control line 260 to determine whether the power supply 210 is operating (as compared to checking for an approximately zero value). Also, in some embodiments, the notification device 230 monitors the negative line 250 (instead of or in addition to monitoring the power line 240) when determining whether a current is flowing between the power supply 210 and the aircraft power source 220.

Also, in some embodiments, as an alternative to or in addition to one or more audio indicators, visual indicators, or a combination thereof, the notification device 230 includes a transceiver configured to communicate with an external device (such as a mobile device, a personal computer, a tablet, or the like). Accordingly, in this embodiment, the controller 305 may transmit a notification (for example, an e-mail message, an application notification, a text, or the like) to the external device in response to detecting a reverse current condition as described above. The notification to the external device may be in addition to, or in replace of, the reverse current notification provided using one or more audio indicators, visual indicators, or a combination thereof included in the notification device 230. For example, in some embodiments, the transceiver may be used to generate a notification after one or more audio indicators, visual indicators, or both have been activated for a predetermined time period without the reverse current condition being addressed (while the reverse current condition continues to exist). In particular, when an audio indicator is activated to alert personnel of a reverse current condition and the current continues for a predetermined time period (for example, 1 to 2 minutes), the transceiver may be used to generate an additional alert. In some embodiments, the notification device may be configured with various settings that control what types of notifications are used, when such notification as used, and the like.

Further, in some embodiments, the first switch 310 and the second switch 315 are controlled in other configurations. For example, in one embodiment, the first switch 310 and the second switch 315 are both energized during a reverse current condition and are both de-energized during a normal current condition. In another embodiment, the first switch 310 and the second switch 315 are both de-energized during a reverse current condition and are both energized during a normal current condition. In yet another embodiment, the first switch 310 and the second switch 315 have opposite positions in the reverse current condition and opposite positions in the normal current condition. Fewer or additional switches than the first switch 310 and the second switch 315 may be used to control which of the first visual indicator 320, the second visual indicator 325, and the audible indicator 330 are active in both the reverse current condition and the normal current condition. In an instance where additional visual or audio indicators are present, additional switches may be implemented.

In addition, in some embodiments, the notification device is configured to take one or more actions to stop or minimize a detected reverse current condition. The components and associated functionality needed to address a detected reverse condition may be extensive given the high current associated with charging the aircraft power source and, when the notification device is located external to both the power supply and the aircraft power source, the notification device may not be suited to safely handle a reverse current condition. Accordingly, as described above, in some embodiments, the notification device only provides alerts without attempting to address the reverse current situation, wherein personnel can use mechanisms included the power supply, the aircraft power source, for both to safely handling this situation.

Various features and advantages of the embodiments described herein are set forth in the following claims.

What is claimed is:

1. An aircraft power system comprising:
an aircraft power source; and
a notification device including a first connection via a control line between the aircraft power source and an external power supply and a second connection via power line between the aircraft power source and the external power supply, the notification device including a control unit configured to:
monitor a voltage value of the control line and a current value of the power line,
determine, based on the voltage value and the current value, a reverse current condition of current flowing from the aircraft power source to an external power supply, and
in response to detecting the reverse current condition, activate an indicator to indicate the reverse current condition.

2. The aircraft power system of claim 1, wherein the notification device is further configured to:
determine, when the voltage value of the control line is above a voltage threshold, that a forward current condition is present, and
determine, when the voltage value of the control line is below the voltage threshold, that the reverse current condition is present.

3. The aircraft power system of claim 1, wherein the notification device is powered by the power line.

4. The aircraft power system of claim 1, wherein the notification device includes at least one selected from a group consisting of a visual indicator and an audible indicator, and wherein the control unit is further configured to:
provide power to the at least one selected from the group consisting of the visual indicator and the audible indicator to provide the notification indicative of the reverse current condition.

5. The aircraft power system of claim 1, wherein the supply of current from the external power supply to the aircraft power source is greater than 1000 amps.

6. The aircraft power system of claim 1, wherein the notification device is located within the external power supply.

7. The aircraft power system of claim 1, wherein the notification device is located within an aircraft housing the aircraft power source.

8. A notification device including a first connection via a control line between an aircraft power source and a power supply located external to the aircraft power source and a second connection via power line between the aircraft power source and the external power supply, the notification device comprising:
a controller configured to:
monitor a voltage value of the control line and a current value of the power line,
determine a reverse current condition based on the voltage value of the control line and the current value of the power line, and
in response to detecting the reverse current condition, activate an indicator to indicate the reverse current condition.

9. The notification device of claim 8, wherein the controller is configured to detect the reverse current condition by detecting when the voltage value is below a predetermined threshold and detecting an active current on the power line.

10. The notification device of claim 8, wherein the indicator is a first visual indicator and wherein the controller is further configured to:
control, in response to detecting a forward current condition, a second visual indicator.

11. The notification device of claim 10, wherein the controller is further configured to:
control, in response detecting to the forward current condition, a first switch coupled between the power line and the first visual indicator to provide power to the first visual indicator, and
control, in response to detecting the reverse current condition, a second switch coupled between the power line and the second visual indicator to provide power to the second visual indicator.

12. The notification device of claim 8, wherein the controller is configured to activate the indicator in response to detecting the reverse current condition by controlling the indicator to an ON condition and wherein the controller is further configured to, in response to detecting a normal operation condition, control the indicator to an OFF condition.

13. The notification device of claim 8, wherein the controller is configured to receive power from the power line.

14. The notification device of claim 8, further comprising a transceiver, and wherein the controller is further configured to:
in response to detecting the reverse current condition, transmit an alert to an external device via the transceiver.

15. A method for detecting a reverse current condition of an aircraft vehicle power system, the vehicle power system including a power supply, a vehicle power source of an aircraft, and a notification device, the notification device including a first connection via a control line between the aircraft power source and an external power supply and a second connection via a power line between the vehicle power source and the power supply, the method comprising:
monitoring, with a controller included in the notification device, a voltage value of the control line and a current value of the power line,
determining, with the controller, a reverse current condition where a current flows in a reverse direction from the vehicle power source to the power supply based on the voltage value of the control line and the current value of the power line, and in response to detecting the reverse current condition, activating, with the controller, at least one selected from a group consisting of a visual indicator and an audible indicator included in the notification device to indicate the reverse current condition.

16. The method of claim 15, wherein detecting the reverse current condition includes detecting when the voltage value is below a voltage threshold.

17. The method of claim 15, further comprising:
in response to detecting the reverse current condition, transmitting, with the controller, a notification indicative of the reverse current condition to an external device.

18. The method of claim 15, wherein activating the at least one selected from the group consisting of the visual indicator and the audible indicator includes
providing, with the notification device, power from the power line to the at least one selected from the group consisting of the visual indicator and the audible indicator.

19. The method of claim 15, wherein detecting, with the controller, the reverse current condition includes detecting the voltage value is below a predetermined threshold and detecting an active current on the power line.

* * * * *